US012764557B2

(12) United States Patent
Jayawardene et al.

(10) Patent No.: US 12,764,557 B2
(45) Date of Patent: Oct. 13, 2026

(54) REPEATER-SPECIFIC SIGNAL BROADCAST FOR OPTIMIZING REPEATER COVERAGE

(71) Applicant: Charter Communications Operating, LLC, St. Louis, MO (US)

(72) Inventors: Diwelawatte P. Jayawardene, Centennial, CO (US); Manthan Ashok Shah, Lone Tree, CO (US); Rajeev Aggarwal, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 613 days.

(21) Appl. No.: 18/455,321

(22) Filed: Aug. 24, 2023

(65) Prior Publication Data

US 2025/0071568 A1 Feb. 27, 2025

(51) Int. Cl.
*H04W 16/26* (2009.01)

(52) U.S. Cl.
CPC .................................. *H04W 16/26* (2013.01)

(58) Field of Classification Search
CPC ............ H04B 7/15578; H04B 7/15535; H04B 7/2606; H04B 7/1555; H04B 7/15528; H04B 7/15507; H04W 16/26; H04W 16/00; H04W 16/32
USPC ......................... 455/445, 446, 447, 448, 449
See application file for complete search history.

(56) References Cited

U.S. PATENT DOCUMENTS

| | | | | |
|---|---|---|---|---|
| 7,778,596 | B2 | 8/2010 | Anderson et al. | |
| 2002/0155838 | A1* | 10/2002 | Durrant | H04B 7/155 455/445 |
| 2021/0136674 | A1* | 5/2021 | Lee | H04W 80/10 |
| 2023/0354378 | A1* | 11/2023 | Gadhai | H04W 76/10 |
| 2024/0284522 | A1* | 8/2024 | Dutta | H04B 7/15557 |

FOREIGN PATENT DOCUMENTS

| | | | | |
|---|---|---|---|---|
| CN | 102812740 A | * 12/2012 | | H04B 7/15578 |
| EP | 3010284 A1 | * 4/2016 | | H04W 36/247 |
| KR | 20090117444 A | * 11/2009 | | H04W 64/00 |

OTHER PUBLICATIONS

Notice of Allowance and Notice of Allowability for U.S. Appl. No. 18/455,278, dated Mar. 13, 2026, 18 pages.

* cited by examiner

*Primary Examiner* — David Q Nguyen
(74) *Attorney, Agent, or Firm* — Dority & Manning, P.A.

(57) ABSTRACT

Information indicative of instructions to measure an area of coverage provided by a signal repeater device can be received. Instructions to broadcast a repeater-specific broadcast signal for each sub-area of a plurality of sub-areas of a service area of the signal repeater device can be sent to the signal repeater device. A corresponding signal measurement of a plurality of signal measurements can be received for each sub-area of the plurality of sub-areas. A coverage map descriptive of the area of coverage provided by the signal repeater device can be generated based at least in part on the plurality of signal measurements.

20 Claims, 5 Drawing Sheets

REPEATER-SPECIFIC SIGNAL BROADCAST FOR OPTIMIZING REPEATER COVERAGE

BACKGROUND

Fifth Generation (5G) New Radio (NR) wireless networks have exhibited substantially greater performance than previous wireless network technologies, such as Fourth Generation (4G) Long-Term Evolution (LTE). For example, the maximum bandwidth provided by 5G NR networks is much higher than that of 4G LTE networks. Some of the performance increases provided by 5G NR networks can be attributed to the utilization of much higher frequency bands, such as those between 24-40 Ghz (also known as mmWave frequency bands). However, higher frequency bands generally suffer from lower effective ranges, thus requiring the utilization of additional hardware resources, such as signal repeaters, to increase the effective range of these frequency bands.

SUMMARY

A network computing system can receive instructions to measure an area of coverage provided by a signal repeater device. Based on instructions from the network computing system, the signal repeater device can broadcast a repeater-specific broadcast signal for each sub-area of a service area of the signal repeater device. The network computing system can generate a coverage map based on signal measurements for the repeater-specific broadcast signals.

In one implementation, a method is provided. The method includes receiving, by a network computing system comprising a processor device, information indicative of instructions to measure an area of coverage provided by a signal repeater device. The method includes sending, by the network computing system to the signal repeater device, instructions to broadcast a repeater-specific broadcast signal for each sub-area of a plurality of sub-areas of a service area of the signal repeater device. The method includes receiving, by the network computing system for each sub-area of the plurality of sub-areas, a corresponding signal measurement of a plurality of signal measurements. The method includes, based at least in part on the plurality of signal measurements, generating, by the network computing system, a coverage map descriptive of the area of coverage provided by the signal repeater device.

In another implementation, a network computing system is provided. The network computing system includes a memory, a signal repeater device, and one or more processor devices. The one and more processor devices are coupled to the memory to receive information indicative of instructions to measure an area of coverage provided by a signal repeater device. The one and more processor devices are further to send, to the signal repeater device, instructions to broadcast a repeater-specific broadcast signal for each sub-area of a plurality of sub-areas of a service area of the signal repeater device. The one and more processor devices are further to receive, for each sub-area of the plurality of sub-areas, a corresponding signal measurement of a plurality of signal measurements. The one and more processor devices are further to, based at least in part on the plurality of signal measurements, generate a coverage map descriptive of the area of coverage provided by the signal repeater device.

In another implementation, a non-transitory computer-readable storage medium is provided. The non-transitory computer-readable storage medium includes executable instructions. The executable instructions are to cause one or more processor devices of the network computing system to receive information indicative of instructions to measure an area of coverage provided by a signal repeater device. The executable instructions are further to cause the one or more processor devices of the network computing system to send, to the signal repeater device, instructions to broadcast a repeater-specific broadcast signal for each sub-area of a plurality of sub-areas of a service area of the signal repeater device. The executable instructions are further to cause the one or more processor devices of the network computing system to receive, for each sub-area of the plurality of sub-areas, a corresponding signal measurement of a plurality of signal measurements. The executable instructions are further to cause the one or more processor devices of the network computing system to, based at least in part on the plurality of signal measurements, generate a coverage map descriptive of the area of coverage provided by the signal repeater device.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
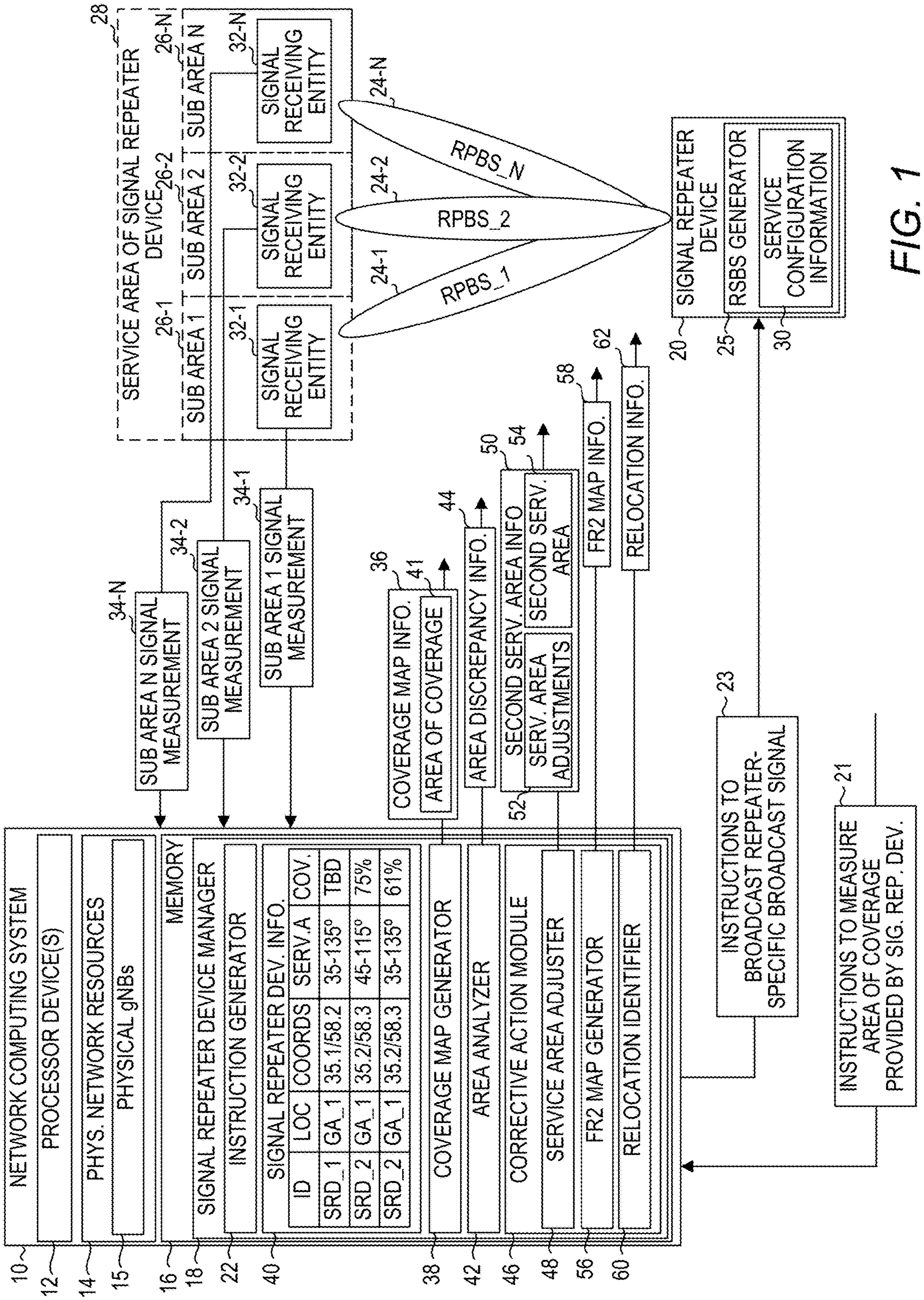
FIG. 1 is a block diagram of an environment suitable for broadcasting a repeater-specific signal to optimize repeater coverage according to some implementations of the present disclosure.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles “a” and “an” in reference to an element refers to “one or more” of the element unless otherwise explicitly specified. The word “or” as used herein and in the claims is inclusive unless contextually impossible. As an example, the recitation of A or B means A, or B, or both A and B. The word “data” may be used herein in the singular or plural depending on the context. The use of “and/or” between a phrase A and a phrase B, such as “A and/or B” means A alone, B alone, or A and B together.

As described previously, Fifth Generation (5G) New Radio (NR) wireless networks provide higher bandwidths than older wireless network technologies due to the utilization of much higher frequency bands. For example, a 5G NR base station, such as a gNodeB (gNB), can provide bandwidths of 2 Gbps on frequency ranges between 24-40 Ghz. However, one tradeoff with higher frequency bands is that they generally suffer from lower effective ranges. To remedy this deficiency, many 5G NR wireless networks utilize additional hardware resources, such as signal repeater devices, to increase the effective range of wireless signaling transmitted at these frequency bands.

Conventional signal repeater devices generally repeat wireless signaling without adding additional information indicating that the signal is being repeated. This lack of identification makes it difficult for a network operator to determine whether signaling received by a UE is received from a gNB or the signal repeater device. Without being able to ascertain whether a signal is being repeated, a network operator cannot accurately measure the coverage area provided by the signal repeater device.

This problem is exacerbated within certain geographic areas, such as cities. For example, due to the large number of buildings in a city that can obstruct wireless signaling, placement of large numbers of signal repeater devices may be required within the same geographic area to ensure full coverage for the area. When many signal repeater devices are placed within the same geographic area, it is likely that the coverage area of two (or more) signal repeater devices will overlap. Accordingly, to measure the coverage area of a signal repeater device, a network operator must first determine whether the signal is being repeated by a signal repeater device, and if so, which signal repeater device is providing the repeated signal.

Accordingly, implementations of the present disclosure propose broadcasting a repeater-specific signal to optimize repeater coverage. More specifically, a network operator may orchestrate a wireless network using a network computing system (e.g., a networked collection of computing devices and/or computing systems). The network computing system can include or otherwise manage a signal repeater device located within a particular geographic area. The network operator may decide to measure the area of coverage provided by a signal repeater device (e.g., during installation of the signal repeater device or other signal repeater devices, etc.).

To do so, the network operator can instruct the network computing system to measure the area of coverage provided by the signal repeater device. The network computing system can send instructions to the signal repeater device to broadcast a repeater-specific broadcast signal to each subarea of the geographic area. For example, assume that the geographic area is a city block within a service area of the signal repeater device. The signal repeater device can iteratively broadcast the repeater-specific broadcast in increments over the service area. Signal receiving entities, such as UEs, can receive the repeater-specific broadcast signal and measure the signal strength of the broadcast signal. The signal receiving entities can provide the signal strength measurements to the network computing system.

Based on the signal strength measurements, the network computing system can generate a coverage map that describes an area of coverage provided by the signal repeater device. In such fashion, the network computing system, in conjunction with the signal repeater device, can utilize a repeater-specific broadcast signal to generate a high-fidelity coverage map that describes the area of coverage provided by the repeater.

Aspects of the present disclosure provide a number of technical effects and benefits. As one example technical effect and benefit, implementations of the present disclosure can substantially reduce inefficiencies in network infrastructure, such as placement of signal repeater devices. For example, network operators cannot conventionally determine whether signaling received by a UE is received from a signal repeater device or from a gNB, thus making it prohibitively difficult, or impossible, to accurately ascertain the coverage area of a signal repeater device. Without the ability to accurately determine coverage areas, network operators must place more signal repeater devices than necessary to ensure coverage for the area. However, implementations of the present disclosure provide accurate determination of coverage areas for signal repeater devices. Based on accurate coverage information, network operators can more optimally place signal repeater devices and thus reduce the number of signal repeater devices required in an area.

FIG. 1 is a block diagram of an environment suitable for broadcasting a repeater-specific signal to optimize repeater coverage according to some implementations of the present disclosure. A network computing system 10 includes processor device(s) 12 and memory 16. In some implementations, the network computing system 10 may be a computing system that includes multiple computing devices. Alternatively, in some implementations, the network computing system 10 may be one or more computing devices within a computing system that includes multiple computing devices. Similarly, the processor device(s) 12 may include any computing or electronic device capable of executing software instructions to implement the functionality described herein.

The network computing system 10 can orchestrate a wireless network (e.g., implement, manage, handle, etc.) various software and/or hardware resources that collectively implement the wireless network. For example, the network computing system 10 can implement network functions or instances of network functions, such User Plane Functions (UPFs), control plane functions (e.g., Session Management Functions (SMFs), Accessibility & Mobility Management Functions (AMFs), etc.).

For another example, the network computing system 10 can include physical network resources 14. The physical network resources 14 can include any type of device, computing device, computing system, networking device or infrastructure, etc. Specifically, the physical network resources 14 can include physical base stations, such as gNBs implemented by physical network resources (e.g., transmitters, receivers, multiplexers, computing device(s), data cables, switches, modems, etc.). The network computing system 10 can orchestrate the physical network resources 14. For example, if the physical network resources 14 include a gNB, the network computing system 10 may orchestrate the gNB to implement multiple network slices, network functions, etc.

In some implementations, the physical network resources 14 can include a plurality of physical gNBs 15. The physical gNBs 15 can be base stations and/or network nodes that are physically located within a geographic environment to provide wireless services to UEs. The physical gNBs 15 can be any type or manner of base station or network node, and can include hardware and/or software resources sufficient to exchange and/or orchestrate network functions and services to enable the exchange of wireless signaling between the physical gNB and UEs served by the physical gNB.

The memory 16 can be or otherwise include any device(s) capable of storing data, including, but not limited to, volatile memory (random access memory, etc.), non-volatile memory, storage device(s) (e.g., hard drive(s), solid state drive(s), etc.). In some implementations, the memory 16 can include a containerized unit of software instructions (i.e., a "packaged container"). The containerized unit of software instructions can collectively form a container that has been packaged using any type or manner of containerization technique.

For example, such a containerized unit of software instructions can include one or more applications, and can further implement any software or hardware necessary for execution of the containerized unit of software instructions within any type or manner of computing environment. For example, the containerized unit of software instructions can include software instructions that contain or otherwise implement all components necessary for process isolation in any environment (e.g., the application, dependencies, configuration files, libraries, relevant binaries, etc.).

The memory 16 can include a signal repeater device manager 18. The signal repeater device manager 18 can be, or otherwise include, a collection of software and/or hardware resources (e.g., physical network resources 14, processor device(s) 12, etc.) that manage the operation of signal repeater devices located within the area of the wireless network orchestrated by the signal repeater device manager 18. In particular, the signal repeater device manager 18 can manage a signal repeater device 20 that is located within the network orchestrated by the network computing system 10.

The signal repeater device 20 can be, or otherwise include, a device that repeats signaling of gNB(s) within range of the signal repeater device 20. Specifically, the signal repeater device 20 can receive wireless signaling and re-broadcast, or otherwise "boost," the effective area of the wireless signaling. More generally, the signal repeater device 20 can serve as a "black box" intermediary that relays information between gNBs of the network computing system 10 and User Equipments (UEs) to extend the range of the gNBs of the network computing system 10.

In many instances, signal repeater devices such as the signal repeater device 20 are non-standardized devices that do not repeat wireless signaling in accordance with any particular wireless standards body. As such, the signal repeater device 20 may not have access to a standardized method of communication to communicate with the network computing system 10 and/or the UEs served by the network computing system 10 (e.g., to identify the signal repeater device, to inform the network computing system 10 that the signal repeater device is repeating wireless signaling, etc.). As such, in these instances, the network computing system 10 and/or the signal receiving entities must determine that the signal repeating device is repeating wireless signaling using various other methods (e.g., evaluating signal quality measurements, etc.).

As described previously, the signal repeater device manager 18 can manage the signal repeater device 20. To do so, the signal repeater device manager 18 can include instruction generator 22. The instruction generator 22 can generate and provide instructions to signal repeater devices, such as the signal repeater device 20. For example, the instruction generator 22 can instruct the signal repeater device 20 to perform various actions such as generating signals, performing diagnostic procedures, determining current coverage, updating firmware, etc. In some implementations, the network computing system 10 can generate such instructions based on receipt of instructions 21 to measure an area of coverage provided by the signal repeating device 20. For example, a network technician may utilize a UE to provide the instructions 21 to the network computing system 10.

Specifically, the instruction generator 22 can generate instructions 23 to broadcast repeater-specific broadcast signals for each sub-area of a service area of the signal repeater device 20. The instruction generator 22 can provide the instructions 23 to the signal repeater device 20 (e.g., via wireless signaling, etc.). In response, the signal repeater device 20 can use a repeater-specific broadcast signal generator 25 to generate repeater-specific broadcast signals 24-1-24-N (generally, signals 24) for corresponding sub-areas 26-1-26-N of a service area 28 of the signal repeater device 20.

In some implementations, the repeater-specific broadcast signals 24 can include a repeater-specific broadcast signal for each sub-area 26 of the service area 28. Alternatively, in some implementations, the signal repeater device 20 can generate a plurality of the repeater-specific broadcast signals 24 for each of the sub-areas 26. The number, type, configuration, etc. of each repeater-specific broadcast can be based on service configuration information 30. For example, the service configuration information 30 may indicate that the repeater-specific broadcast signals 24 be implemented in a narrow channel (e.g., around 10-30 Mhz or some other range that is relatively narrow with regards to standard signaling) with a lower EIRP than the standard utilized EIRP (e.g., around 30-60 dBM or similar).

In addition, the service configuration information 30 can additionally describe the service area 28 for the signal repeater device 20. In some implementations, the service area 28 of the signal repeater device 20 can be defined geographically. For example, the service area 28 of the signal repeater device 20 can be defined as an area between geolocational coordinates (e.g., a box with each corner defined by a corresponding pair of coordinates). Additionally, or alternatively, in some implementations, because many signal repeater devices are directional, the service area 28 of the signal repeater device 20 can be defined as a space between two vectors originating at different angles from the repeater device. In other words, the service area 28 can be defined as a "slice" of a two-dimensional circular area around the signal repeater device, and the "slice" can be defined relative to the direction at which the signal repeater device 20 is facing.

For example, assume the direction the signal repeater device 20 is pointing is 90° (e.g., due east). The service configuration information 30 may indicate that the service area 28 is between 60°-120°. In some implementations, the service configuration information 30 can additionally limit the service area 28 as being a maximum distance from the signal repeater device 20. For example, the service configuration information 30 can indicate that, at 60°, the service area 28 ends 200 yards from the signal repeater device 20, and at 70°, the service area ends 250 yards from the signal repeater device 20.

In some implementations, the signal repeater device 20 can utilize the RSBS generator 25 to iteratively generate repeater-specific broadcast signals 24 at the set increments indicated by the service configuration information 30 across the service area 28 of the signal repeater device 20.

In some implementations, the sub-areas 26 of the service area 28 can be demarcated in accordance with the same set increments of 10°. For example, if the service area of the signal repeater device 20 is defined as being between 60°-120°, and the service configuration information 30 indicates set increments of 10°, the sub-area 26-1 can be a portion of the service area 28 60° from the signal repeater device 20, the sub-area 26-2 can be a portion of the service area 28 70° from the signal repeater device 20, the sub-area 26-N can be a portion of the service area 28 120° from the signal repeater device 20, etc.

For example, the RSBS generator 25 can generate and broadcast the repeater-specific broadcast signal 24-1 at a direction of 60° relative to the signal repeater device 20. The RSBS generator 25 can increment the current direction by 10° and then broadcast the repeater-specific broadcast signal 24-2 at a direction of 70° relative to the signal repeater device 20. The RSBS generator 25 can continue this process until the repeater-specific broadcast signal 24-N is generated and broadcasted at a direction of 120° relative to the signal repeater device 20.

Signal receiving entities 32-1-32-N (generally signal receiving entities 32) can be, or otherwise include, devices that can receive and measure the signal strength of the repeater-specific broadcast signals 24 (e.g., smartphones, UEs, Wireless Communication Devices (WCDs), signal measuring devices, etc.). In particular, the repeater-specific broadcast signals 24 can instruct the signal receiving entities 32 to generate signal measurements 34-1-34-N (generally, signal measurements 34) that measure a signal strength of the repeater-specific broadcast signals 24 when received. The repeater-specific broadcast signals 24 can further instruct the signal receiving entities 32 to provide the signal measurements 34 to the network computing system 10.

In some implementations, a separate signal receiving entity can receive a corresponding repeater-specific broadcast signal 24 in a corresponding sub-area 26 of the service area 28 of the signal repeater device 20. For example, the signal receiving entity 32-1 can receive and measure the repeater-specific broadcast signal 24-1. The signal receiving entity 32-1 can generate signal measurements 34-1 and send the signal measurements 34-1 to the network computing system 10. The signal receiving entity 32-2 can receive and measure the repeater-specific broadcast signal 24-2. The signal receiving entity 32-2 can generate signal measurements 34-2 and send the signal measurements 34-2 to the network computing system 10.

Alternatively, in some implementations, one (or more) signal receiving entities 32 can be utilized to receive and measure multiple repeater-specific broadcast signals 24 in multiple sub-areas 26 of the service area 28. For example, the signal receiving entity 32-1 can be located in sub-area 26-1. There the signal receiving entity 32-1 can receive and measure repeater-specific broadcast signal 24-1 to generate the signal measurement 34-1. The signal receiving entity 32-1 can be relocated to the sub-area 26-2. There, the signal receiving entity 32-1 can receive and measure repeater-specific broadcast signal 24-2 to generate the signal measurement 34-2.

In some implementations, one or more signal repeater entities 32 can measure a repeater-specific broadcast signal 24 from different locations within the same sub-area 26. For example, the signal receiving entity 32-1 may receive and measure the repeater-specific broadcast signal 24-1 when located 60° and 50 yards from signal repeater device 20. The signal receiving entity 32-1 may then be relocated to 60° and 100 yards from the signal repeater device 20. Once relocated, the signal receiving entity 32-1 can again receive and measure the repeater-specific broadcast signal 24-1. The signal measurements 34-1 can include the measurements made by the signal receiving entity 32-1 at multiple locations.

Additionally, or alternatively, in some implementations, multiple signal receiving entities 32 located within the same sub-area 26 can independently receive and measure the same repeater-specific broadcast signal 24. Accordingly, each of the signal measurements 34 can, in some implementations, include signal measurements from multiple signal receiving entities 32. To follow the previous example, assume that the signal receiving entity 32-1 receives and measures the repeater-specific broadcast signal 24-1 when located 60° and 50 yards from signal repeater device 20 within the sub-area 26-1. If the signal receiving entity 32-2 is already located 60° and 100 yards from signal repeater device 20 within the sub-area 26-1, the signal receiving entity 32-2 can receive and measure the repeater-specific broadcast signal 24-1 at that location rather than relocating the signal receiving entity 32-1.

It should be noted that the repeater-specific broadcast signals 24 are not necessarily generated for a particular signal receiving entity 32-1. Rather, in some implementations, the RSBS generator 25 may generate the repeater-specific broadcast signals 24 without any particular target. More specifically, in some instances, the network orchestrated by the network computing system 10 can provide wireless service to thousands of signal receiving entities 32 located within the service area 28. As such, the repeater-specific broadcast signals 24 can simply include instructions that instruct any device receiving the repeater-specific broadcast signals 24 to measure the signal and generate signal measurements 34. Due to the density of signal receiving entities 32 located within the service area 28, the network computing system is likely to receive the signal measurements 34 from multiple signal receiving entities 32 for each sub-area 26-1.

The network computing system 10 can receive the signal measurements 34. Based on the signal measurements 34, the network computing system 10 can generate coverage map information 36 using a coverage map generator 38. The coverage map information 36 can describe an area of coverage provided by the signal repeater device 20. More specifically, the coverage map information 36 can describe the signal measurements 34 for the repeater-specific broadcast signals 24 received by the signal receiving entities 32 within each of the sub-areas 26.

In some implementations, the coverage map information 36 can indicate whether the signal repeater device 20 is sufficient to provide signaling with certain QoS parameters at particular sub-areas. For example, the network computing system 10 may require that the wireless signaling repeated by the signal repeater device 20 have a bandwidth, such as 1 Gbps. However, the signal measurements 34-1 for the sub-area 26-1 may indicate that the maximum bandwidth received in that sub-area is 0.5 Gbps. The coverage map information 36 can indicate that the coverage provided by the signal repeater device 20 in the sub-area 26-1 is insufficient.

In some implementations, the coverage map information 36 can depict a representation of the signal measurements 34 overlaying a depiction of the service area 28 of the signal repeater device 20. Specifically, if the service area 28 is a portion of a city (e.g., an angular "slice" of the city originating from the signal repeater device 20, etc.), the coverage map information 36 can include a map representation of this portion of the city and can further include a depiction of the signal measurements 34 overlayed on the map representation. For example, the depiction of the signal measurements 34 may be a color-coded representation that corresponds to the relative strength of the signal as measured by the signal measurements 34 (e.g., green if substantially higher than a signal strength threshold, yellow if close to a signal strength threshold, red if below a signal strength threshold, etc.). Alternatively, the signal measurements 34 may be indicated in some other manner within the coverage map information 36. For example, signal strength metrics included in the signal measurements 34 can be overlayed upon the depiction of the service area 28.

In some implementations, the coverage map information 36 can identify a particular sub-area, sub-areas, or portion of a sub-area that either (a) has no corresponding signal strength measurements, or (b) has corresponding signal strength measurements that are below a signal strength threshold. For example, the signal measurements 34-2 for the sub-area 26-2 may indicate that the strength of the repeater-specific broadcast signal 24-2 is substantially lower than a signal strength threshold. For another example, assume that the signal receiving entity 32-N suffers a hardware failure and cannot receive and measure the repeater-specific broadcast signal 24-N. In this instance, the signal receiving entity 32-N cannot generate the signal strength measurement 34-N and thus the coverage map information 36 can indicate that no measurements were received for the sub-area 26-N.

In some implementations, the coverage map information 36 can depict, or otherwise indicate, an area of coverage 41 provided by the signal repeater device 20. For example, the signal receiving entities 32 can traverse the service area 28, and possibly outside of the service area 28, while measuring the repeater-specific broadcast signals 24 to identify the borders of the area of coverage 41 provided by the signal repeater device 20. In some implementations, the area of coverage 41 can be different than the service area 28 of the signal repeater device 20.

In some implementations, the network computing system 10 can include signal repeater device information 40. The signal repeater device information 40 can indicate the service area 28 for the signal repeater device 20. In addition, the signal repeater device information 40 can indicate an identifier, location, coordinates, and measured service area coverage for the signal repeater device 20. The signal repeater device information 40 can also include the same information for other signal repeater devices located within a same geographic area as the signal repeater device 20. For example, assume that the signal repeater device 20 and a plurality of other signal repeater devices are all located within a city. The locations of the signal repeater device 20 and the other signal repeater devices to maximize coverage of a gNB located within the city.

In some implementations, the network computing system 10 can include an area analyzer 42. The area analyzer 42 can generate area discrepancy information 44 by analyzing the area of coverage 41 included in the coverage map information 36 and the service area 28 indicated by the signal repeater device information 40. The area discrepancy information 44 can indicate, or otherwise describe, discrepancies between the area of coverage 41 and the service area 28. In some implementations, the area of coverage 41 may be larger, or smaller, than the service area 28. Additionally, or alternatively, in some implementations, some portions of the area of coverage 41 can be greater than the service area 28 while other portions are smaller than the service area 28. For example, the area of coverage provided by the signal repeater device 20 may extend past the sub-area 26-1 (and thus outside the service area 28) while the area of coverage may also fail to provide complete coverage of the sub-area 26-N.

In some implementations, the network computing system 10 can include a corrective action module 46. The corrective action module 46 can perform various corrective actions based on the signal measurements 34, the coverage map information 36, the signal repeater device information 40, etc. To do so, the corrective action module 46 can include a service area adjuster 48. The service area adjuster 48 can generate second service area information 50 based on the coverage map information 36, the area discrepancy information 44, and/or the signal repeater device information 40.

The second service area information 50 can include service area adjustments 52. The service area adjustments 52 can include instructions to modify a service area of an existing signal repeater device, such as the signal repeater device 20, or another signal repeater device. For example, assume that the area discrepancy information 44 indicates that the area of coverage 41 of the signal repeater device 20 includes an area not included in the service area 28. The service area adjustments 52 can adjust the service area 28 to include the area indicated by the area discrepancy information. For another example, assume that the area of coverage 41, in conjunction with the signal repeater device information 40, indicates that the area of coverage 41 of the signal repeater device 20 overlaps with the area of coverage of some other signal repeater device. The service area adjustments 52 may modify the service area 28, or the service area of the other signal repeater device, to remove the overlapping portion.

Additionally, or alternatively, in some implementations, the second service area information 50 can include a second service area 54. The second service area 54 can be a service area for the signal repeater device 20 that is different than the service area 28. In some implementations, the second service area 54 can be implemented at the signal repeater device 20 with the service area adjustments 52. Alternatively, in some implementations, the second service area 54 can be implemented by relocating the signal repeater device 20, which will be discussed subsequently.

In some implementations, the corrective action module 46 can include a Frequency Range 2 (FR2) map generator 56. The FR2 map generator 56 can generate FR2 map information 58 indicative of FR2 coverage within the service area 28. Specifically, the FR2 map information 58 can indicate FR2 coverage within the service area 28 collectively provided by the signal repeater device 20 and any other signal repeater devices located within the same geographic area as the signal repeater device 20. For example, the FR2 map generator 56 can evaluate the coverage map information 36 and the signal repeater device information 40 to generate FR2 map information 58. The FR2 map information 58 can indicate FR2 coverage within the service area 28 from all signal repeater device(s) and any gNBs in the area. For another example, assume that the service area adjuster 48 generates the second service area information 50 that includes the service area adjustments 52. The signal repeater device 20 can implement the second service area 54. The FR2 map generator 56 can generate the FR2 map information 58 for the second service area 54.

In some implementations, the corrective action module 46 can include a relocation identifier 60. The relocation identifier 60 can generate relocation information 62. The relocation information 62 can indicate a new location for the signal repeater device to be located to. For example, assume that the coverage map information 36 indicates that the area of coverage 41 does not cover the sub-area 26-1 of the service area 28 due to a physical obstruction (e.g., a building). The relocation identifier 60 can generate the relocation information 62 that identifies a new location to which the signal repeater device 20 can be relocated to. The relocation identifier 60 can generate the relocation information 62 based on mapping information, prior signal strength measurements, geographic information, etc.

In some implementations, the relocation identifier 60 can generate the relocation information 62 based on the second service area 54 indicated by the second service area information 50. For example, the second service area 54 may require that the signal repeater device 20 be relocated to some other location. The relocation identifier 60 can generate the relocation information 62 that identifies a location that is sufficient for the signal repeater device 20 to provide an area of coverage that covers the second service area 54.

Figure 2A:
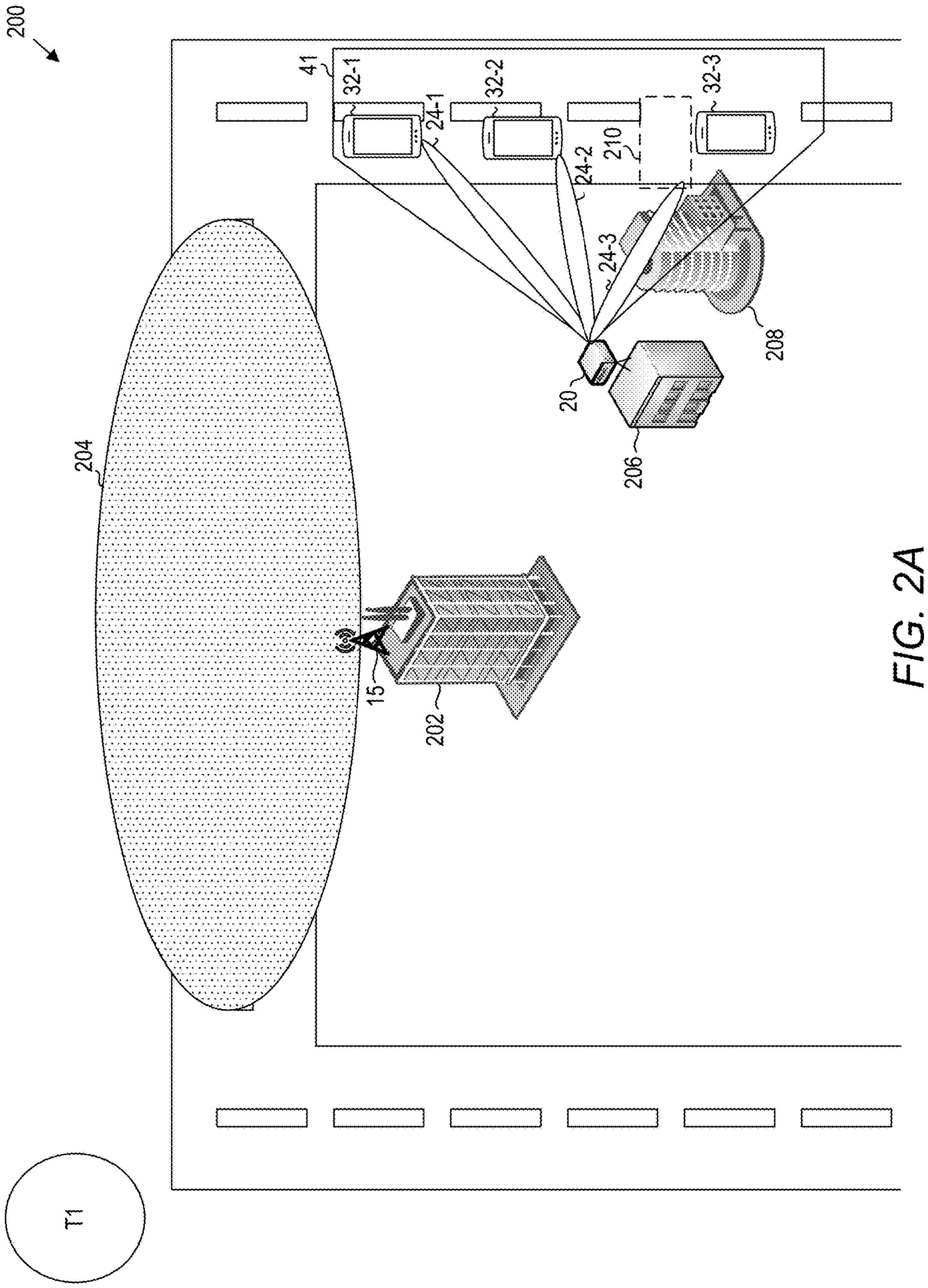
FIGS. 2A-2B illustrate an example scenario in which signal repeater device coverage is optimized by broadcasting repeater-specific signals according to some implementations of the present disclosure.
Figure 2B:
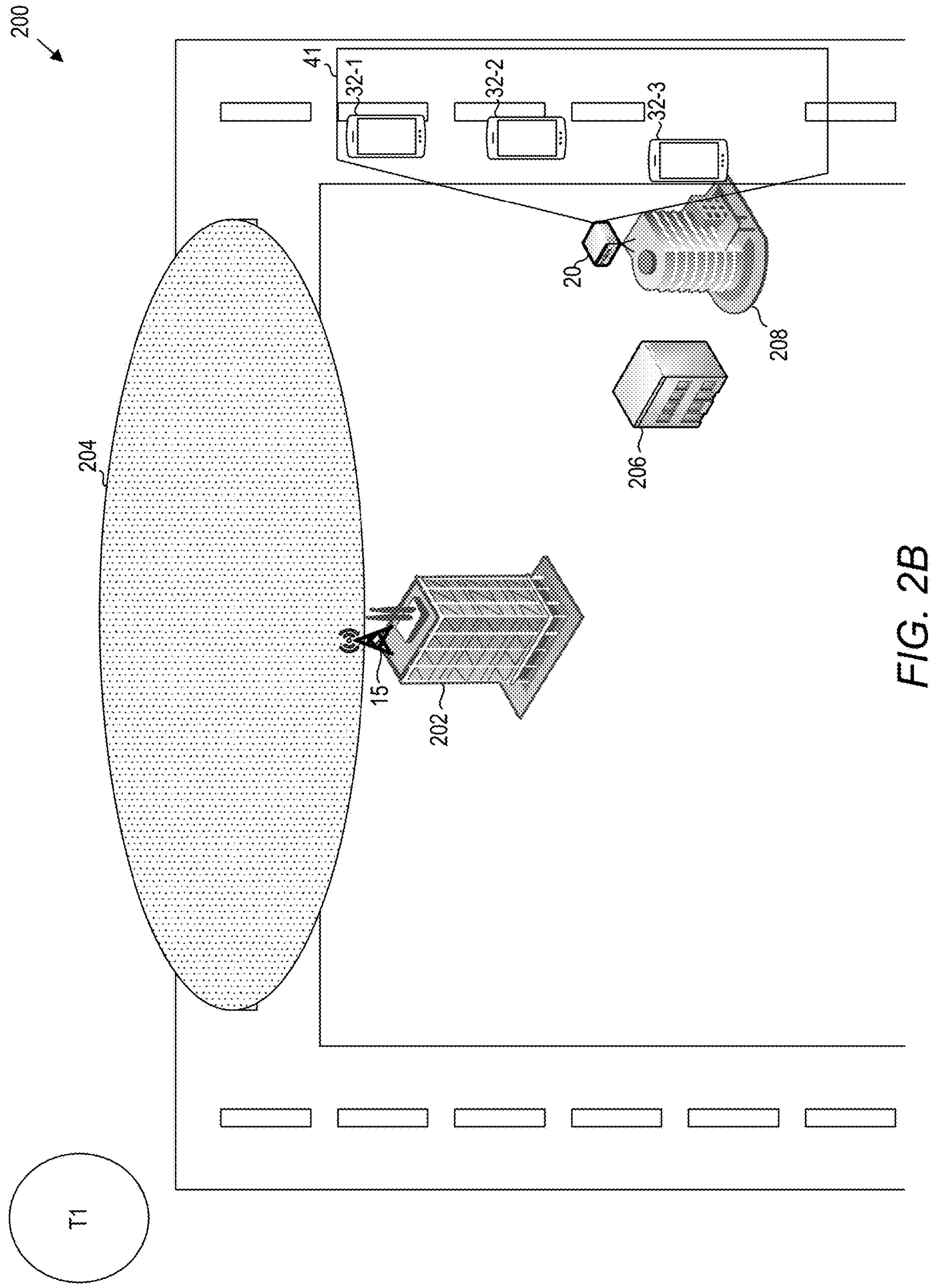

FIGS. 2A-2B illustrate an example scenario 200 in which signal repeater device coverage is optimized by broadcasting repeater-specific signals according to some implementations of the present disclosure. FIGS. 2A-2B will be discussed in conjunction with FIG. 1. Specifically, at time T1, FIG. 2A illustrates one of the physical gNBs 15 placed on a tall building 202 located within a city block. The physical gNB 15 provides wireless signaling within a gNB coverage area 204. The gNB coverage area 204 can be an area in which wireless signaling provided by the physical gNB 15 meets certain signal strength and/or QoS parameters. However, it should be noted that the physical gNB 15 may be able to provide wireless signaling outside of the gNB coverage area 204 that fulfills, or intermittently fulfills, the signal strength and/or QoS parameters.

The signal repeater device 20 can be located on a building 206 within the same geographic area as the physical gNB 15. The signal repeater device 20 can repeat wireless signaling from the physical gNB 15. As described with regards to FIG. 1, the signal repeater device 20 can receive instructions to generate repeater-specific broadcast signals 24-1-24-3 to measure the area of coverage 41.

In response, the signal repeater device 20 can generate and broadcast the repeater-specific broadcast signals 24-1-24-3, which can be received by corresponding signal receiving entities 32-1-32-3. The signal receiving entities 32-1-32-3 can provide signal 34-1-34-3 for the repeater-specific broadcast signals 24-1-24-3. The area of coverage 41 can be identified based on the signal strength measurements received from the signal receiving entities 32-1-32-3.

As depicted, a building 208 may act as a physical obstruction for the signal repeater device 20 by obstructing the repeater-specific broadcast signal 212-3 prior to receipt by the signal receiving entity 216-3. This obstruction is indicated by the area of coverage 41, which includes a coverage gap 210 in which coverage is not being provided by the signal repeater device 20.

Turning to FIG. 2B, at a time T2 subsequent to T1, a corrective action can be performed to eliminate the coverage gap 220. FIG. 2B will be discussed in conjunction with FIG. 1. In particular, the relocation identifier 60 can generate relocation information 62 based on the area of coverage 41. The relocation information 62 can indicate a second location for the signal repeater device 20. In particular, the second location for the signal repeater device 20 can be atop the building 208 that obstructed the wireless signaling from the signal repeater device 20 and caused the coverage gap 210.

As depicted, the signal repeater device 20 can be relocated to the building 208 based on the relocation information 62. By relocating the signal repeater device 20, the building 208 no longer obstructs wireless signaling from the signal repeater device 20, and thus, the coverage gap 210 can be eliminated. In such fashion, the area of coverage 41 for the signal repeater device 20 can be optimized by broadcasting the repeater-specific broadcast signals 24-1-24-3.

Figure 3:
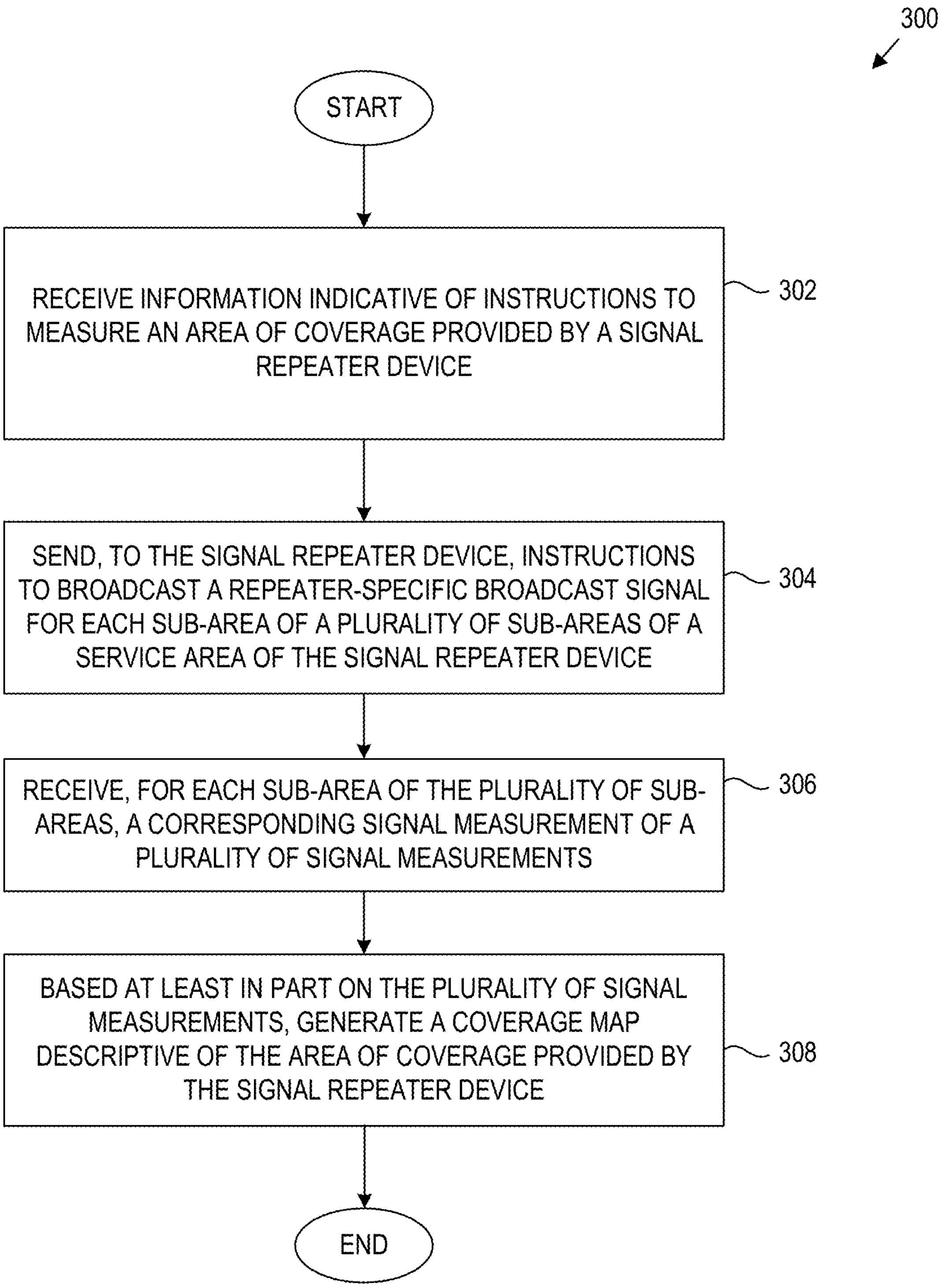
FIG. 3 is a flow chart diagram for a method for broadcasting a repeater-specific signal to optimize repeater coverage according to some implementations of the present disclosure.

FIG. 3 is a flow chart diagram for a method 300 for broadcasting a repeater-specific signal to optimize repeater coverage according to some implementations of the present disclosure. Although FIG. 3 depicts operations performed in a particular order for purposes of illustration and discussion, the methods of the present disclosure are not limited to the particularly illustrated order or arrangement. The various operations of the method 300 can be omitted, rearranged, combined, and/or adapted in various ways without deviating from the scope of the present disclosure.

At 302, a network computing system can receive information indicative of instructions to measure an area of coverage provided by a signal repeater device. For example, the network computing system may simply instruct the signal repeater device to generate repeater-specific broadcast signals to determine the area of coverage. Alternatively, the network computing system may specify properties of the repeater-specific broadcast signals (e.g., Effective Isotropic Radiated Power (EIRP), frequency, etc.), a type of signal (e.g., control channel signals, etc.), a broadcast pattern for the signals, signal targets (e.g., target signal receiving entities), etc.

At 304, the network computing system can send, to the signal repeater device, instructions to broadcast a repeater-specific broadcast signal for each sub-area of a plurality of sub-areas of a service area of the signal repeater device. In some implementations, the repeater-specific broadcast signal includes a narrow-band channel of about 20 Mhz. Additionally, or alternatively, in some implementations, the repeater-specific broadcast signal includes an EIRP of about 45 dBM or less.

At 306, the network computing system can receive, for each sub-area of the plurality of sub-areas, a corresponding signal measurement of a plurality of signal measurements.

At 308, the network computing system can, based at least in part on the plurality of signal measurements, generate a coverage map descriptive of the area of coverage provided by the signal repeater device. In some implementations, the network computing system can determine a difference between the service area and the area of coverage provided by the signal repeater device.

In some implementations, the network computing system can perform a corrective action based on a difference between the service area and the area of coverage provided by the signal repeater device. In some implementations, the network computing system can determine a second service area for the signal repeater device different than the service area. In some implementations, determining the second service area can include respectively obtaining one or more second coverage maps for one or more second signal repeater devices located within a same geographic area as the signal repeater device. Determining the second service area can further include determining the second service area for the signal repeater device based on the coverage map and the one or more second coverage maps.

In some implementations, the network computing system can generate a FR2 coverage map for the geographic area based on the coverage map and the one or more second coverage maps. In some implementations, the network computing system can provide information descriptive of the FR2 coverage map for the geographic area.

In some implementations, performing the corrective action based on the coverage map can include generating, based on the coverage map, information indicative of instructions to adjust a service area of the signal repeater device or a service area of a second signal repeater device. Additionally, or alternatively, in some implementations, generating the information indicative of the instructions to adjust the service area of the signal repeater device can include generating relocation information comprising coordinates for a new location for the signal repeater device. Additionally, or alternatively, in some implementations, generating the information indicative of the instructions to adjust the service area of the signal repeater device can include providing service area adjustment instructions to the signal repeater device and/or the second signal repeater device.

Figure 4:
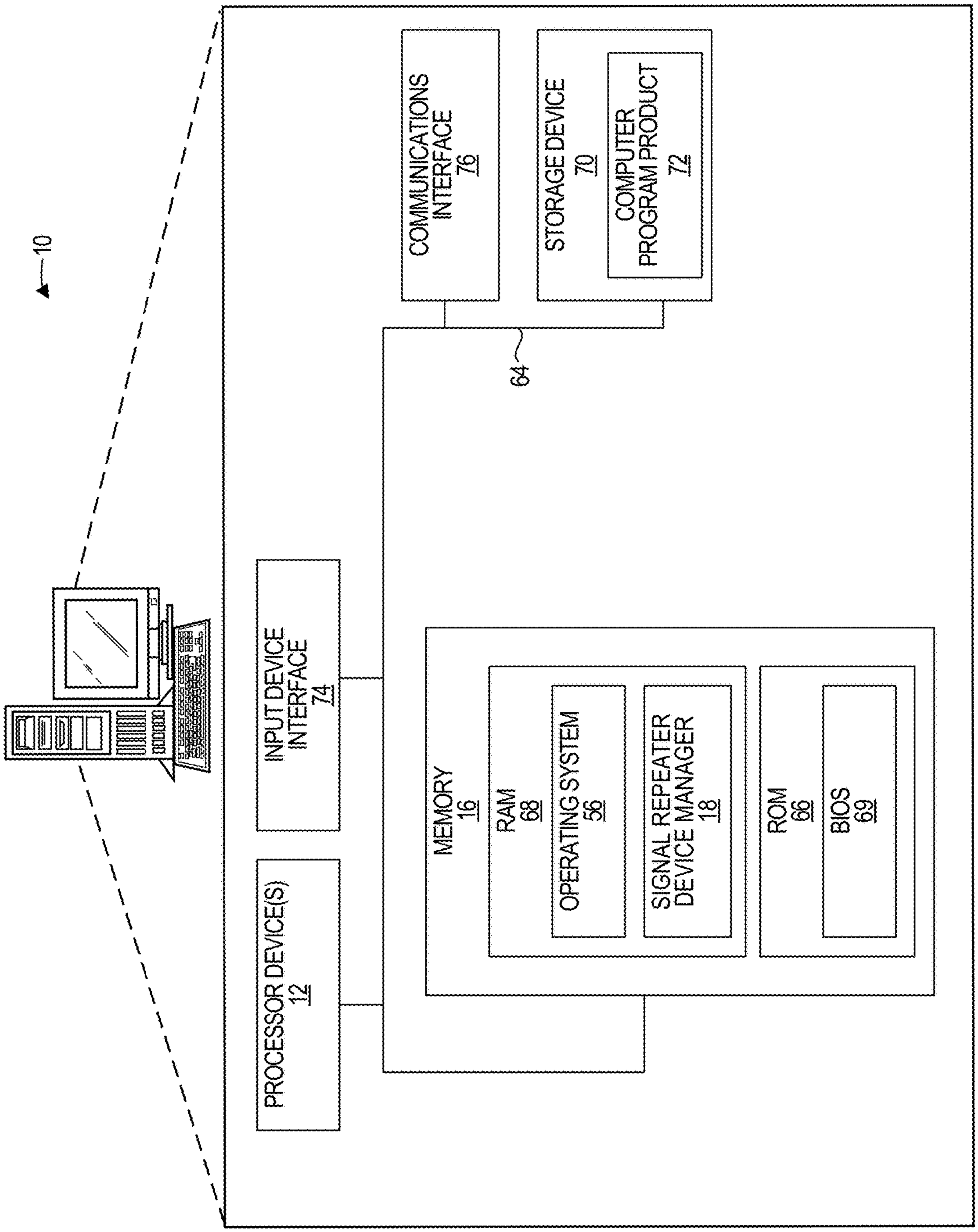
FIG. 4 is a block diagram of the network computing system suitable for implementing examples according to one implementation of the present disclosure.

FIG. 4 is a block diagram of the network computing system 10 suitable for implementing examples according to one implementation of the present disclosure. The network computing system 10 may comprise any computing or electronic device capable of including firmware, hardware, and/or executing software instructions to implement the functionality described herein, such as a computer server, a desktop computing device, a laptop computing device, a smartphone, a computing tablet, or the like. The network computing system 10 includes the processor device(s) 12, the memory 16, and a system bus 64. The system bus 64 provides an interface for system components including, but not limited to, the memory 16 and the processor device(s) 12. The processor device(s) 12 can be any commercially available or proprietary processor.

The system bus 64 may be any of several types of bus structures that may further interconnect to a memory bus (with or without a memory controller), a peripheral bus, and/or a local bus using any of a variety of commercially available bus architectures. The memory 16 may include non-volatile memory 66 (e.g., read-only memory (ROM), erasable programmable read-only memory (EPROM), electrically erasable programmable read-only memory (EEPROM), etc.), and volatile memory 68 (e.g., random-access memory (RAM)). A basic input/output system (BIOS) 69 may be stored in the non-volatile memory 66 and can include the basic routines that help to transfer information between elements within the network computing system 10. The volatile memory 68 may also include a high-speed RAM, such as static RAM, for caching data.

The network computing system 10 may further include or be coupled to a non-transitory computer-readable storage medium such as a storage device 70, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 70 and other drives associated with computer-readable media and computer-usable media may provide non-volatile storage of data, data structures, computer-executable instructions, and the like.

A number of modules can be stored in the storage device 70 and in the volatile memory 68, including an operating system and one or more program modules, such as the signal repeater device manager 18, which may implement the functionality described herein in whole or in part. All or a portion of the examples may be implemented as a computer program product 72 stored on a transitory or non-transitory computer-usable or computer-readable storage medium, such as the storage device 70, which includes complex programming instructions, such as complex computer-readable program code, to cause the processor device(s) 12 to carry out the steps described herein. Thus, the computer-readable program code can comprise software instructions for implementing the functionality of the examples described herein when executed on the processor device(s) 12. The processor device(s) 12, in conjunction with the signal repeater device manager 18 in the volatile memory 68, may serve as a controller, or control system, for the network computing system 10 that is to implement the functionality described herein.

Because the signal repeater device manager 18 is a component of the network computing system 10, functionality implemented by the signal repeater device manager 18 may be attributed to the network computing system 10 generally. Moreover, in examples where the signal repeater device manager 18 comprises software instructions that program the processor device(s) 12 to carry out functionality discussed herein, functionality implemented by the signal repeater device manager 18 may be attributed herein to the processor device(s) 12.

An operator, such as a user, may also be able to enter one or more configuration commands through a keyboard (not illustrated), a pointing device such as a mouse (not illustrated), or a touch-sensitive surface such as a display device. Such input devices may be connected to the processor device(s) 12 through an input device interface 74 that is coupled to the system bus 64 but can be connected by other interfaces such as a parallel port, an Institute of Electrical and Electronic Engineers (IEEE) 1394 serial port, a Universal Serial Bus (USB) port, an IR interface, and the like. The network computing system 10 may also include the communications interface 76 suitable for communicating with the network as appropriate or desired. The network computing system 10 may also include a video port configured to interface with a display device, to provide information to the user.

Individuals will recognize improvements and modifications to the preferred examples of the disclosure. All such improvements and modifications are considered within the scope of the concepts disclosed herein and the claims that follow.

What is claimed is:

1. A method, comprising:

receiving, by a network computing system comprising a processor device, information indicative of instructions to measure an area of coverage provided by a signal repeater device;

sending, by the network computing system to the signal repeater device, instructions to broadcast a repeater-specific broadcast signal for each sub-area of a plurality of sub-areas of a service area of the signal repeater device;

receiving, by the network computing system for each sub-area of the plurality of sub-areas, a corresponding signal measurement of a plurality of signal measurements; and based at least in part on the plurality of signal measurements, generating, by the network computing system, a coverage map descriptive of the area of coverage provided by the signal repeater device.

2. The method of claim 1, wherein the method further comprises:

determining, by the network computing system, a difference between the service area and the area of coverage provided by the signal repeater device.

3. The method of claim 1, wherein the method further comprises:

performing, by the network computing system, a corrective action based on a difference between the service area and the area of coverage provided by the signal repeater device.

4. The method of claim 3, wherein performing the corrective action based on the coverage map comprises:

determining, by the network computing system, a second service area for the signal repeater device different than the service area.

5. The method of claim 4, wherein determining the second service area for the signal repeater device different than the service area comprises:

respectively obtaining, by the network computing system, one or more second coverage maps for one or more second signal repeater devices located within a same geographic area as the signal repeater device; and determining, by the network computing system, the second service area for the signal repeater device based on the coverage map and the one or more second coverage maps.

6. The method of claim 5, wherein the method further comprises:

generating, by the network computing system, a Frequency Range 2 (FR2) coverage map for the geographic area based on the coverage map and the one or more second coverage maps.

7. The method of claim 6, wherein the method further comprises:

providing, by the network computing system, information descriptive of the FR2 coverage map for the geographic area.

8. The method of claim 3, wherein performing the corrective action based on the coverage map comprises:

generating, by the network computing system based on the coverage map, information indicative of instructions to adjust a service area of the signal repeater device or a service area of a second signal repeater device.

9. The method of claim 8, wherein generating the information indicative of the instructions to adjust the service area of the signal repeater device comprises:

generating, by the network computing system, relocation information comprising coordinates for a new location for the signal repeater device.

10. The method of claim 8, wherein generating the information indicative of the instructions to adjust the service area of the signal repeater device:

providing, by the network computing system, service area adjustment instructions to the signal repeater device and/or the second signal repeater device.

11. The method of claim 1, wherein the repeater-specific broadcast signal comprises a narrow-band channel of about 20 Mhz.

12. The method of claim 1, wherein the repeater-specific broadcast signal comprises an Effective Isotropic Radiated Power (EIRP) of about 45 dBM or less.

13. A network computing system, comprising:

a memory;

a signal repeater device; and one or more processor devices coupled to the memory to:

receive information indicative of instructions to measure an area of coverage provided by a signal repeater device;

send, to the signal repeater device, instructions to broadcast a repeater-specific broadcast signal for each sub-area of a plurality of sub-areas of a service area of the signal repeater device;

receive, for each sub-area of the plurality of sub-areas, a corresponding signal measurement of a plurality of signal measurements; and based at least in part on the plurality of signal measurements, generate a coverage map descriptive of the area of coverage provided by the signal repeater device.

14. The network computing system of claim 13, wherein the one or more processor devices are further to:

perform a corrective action based on the coverage map.

15. The network computing system of claim 14, wherein performing the corrective action based on the coverage map comprises:

determining a second service area for the signal repeater device different than the service area.

16. The network computing system of claim 15, wherein determining the second service area for the signal repeater device different than the service area comprises:

respectively obtaining one or more second coverage maps for one or more second signal repeater devices located within a same geographic area as the signal repeater device; and determining the second service area for the signal repeater device based on the coverage map and the one or more second coverage maps.

17. The network computing system of claim 16, wherein the one or more processor devices are further to:

generate a FR2 coverage map for the geographic area based on the coverage map and the one or more second coverage maps.

18. The network computing system of claim 17, wherein the one or more processor devices are further to:

provide information descriptive of the FR2 coverage map for the geographic area.

19. The network computing system of claim 14, wherein performing the corrective action based on the coverage map comprises:

generating relocation information comprising coordinates for a new location for the signal repeater device and a second service area different than the service area.

20. A non-transitory computer-readable storage medium that includes executable instructions to cause one or more processor devices of a network computing system to:

receive information indicative of instructions to measure an area of coverage provided by a signal repeater device;

send, to the signal repeater device, instructions to broadcast a repeater-specific broadcast signal for each sub-area of a plurality of sub-areas of a service area of the signal repeater device;

respectively receive a plurality of signal measurements for the plurality of sub-areas of the service area of the signal repeater device; and generate a coverage map descriptive of the area of coverage provided by the signal repeater device.

* * * * *